United States Patent [19]

Björklund et al.

[11] Patent Number: 5,778,462
[45] Date of Patent: Jul. 14, 1998

[54] DEVICE IN SEPARATION-TYPE TOILET SYSTEMS

[75] Inventors: Kenneth Björklund, Västra Frölunda; Altti Berglind, Askim, both of Sweden

[73] Assignee: Pecunia Industries Ltd, Causeway Bay, Hong Kong

[21] Appl. No.: 750,548

[22] PCT Filed: Feb. 23, 1995

[86] PCT No.: PCT/SE95/00189

§ 371 Date: Dec. 2, 1996

§ 102(e) Date: Dec. 2, 1996

[87] PCT Pub. No.: WO95/32658

PCT Pub. Date: Dec. 7, 1995

[30] Foreign Application Priority Data

May 30, 1994 [SE] Sweden .................. 9401857

[51] Int. Cl.[6] .................................................. A47K 4/00
[52] U.S. Cl. .................................. 4/463; 4/476; 4/460
[58] Field of Search .............................. 4/463, 460, 449, 4/462, 476, 477, 478

[56] References Cited

U.S. PATENT DOCUMENTS 904,293  11/1908  Allen .............................. 4/463
5,029,348  7/1991  Boren ............................ 4/460
5,379,466  1/1995  Davies .......................... 4/449

FOREIGN PATENT DOCUMENTS 3-176533A  7/1991  Japan ............................ 4/477

Primary Examiner—David J. Walczak
Attorney, Agent, or Firm—Dvorak & Orum

[57] ABSTRACT

A device in connection with a separation-type of toilet systems, i.e. having separate feces and urine reception means located beneath a seat opening, a urine receptacle debouching into the front part of the seat opening and a feces receptacle debouching into the rear part of the seat opening, as seen in the direction of the person assuming a sitting position above the seat opening. In accordance with the invention the toilet seat is located inside a toilet space, the headroom of which above and in front of said seat is sufficient to allow said person to assume a comfortable sitting position above said opening but at the same time insufficient to allow a standing position, thus preventing or making considerably difficult urination from in front of the seat opening.

16 Claims, 3 Drawing Sheets

DEVICE IN SEPARATION-TYPE TOILET SYSTEMS

Particularly in case of field toilets there in an increasing need for use of toilet systems of separation-type, i.e. having separate feces and urine reception means located beneath a seat opening. In such separation-type of toilets a urine receptacle debouches in the front part of the seat opening whereas a feces receptacle debouches into the rear part of the seat opening as seen in the direction of the person assuming a sitting position above the seat opening.

In the case of toilets of this kind it is very important that the person using the toilet assumes such a sitting position that the urine is received in the receptacle intended therefor and the feces are received in a separate container intended therefor. Should the user instead assume a standing position in front of the seat opening and urinate into the latter, urine will spill into the feces receptacle. This will very negatively influence the function of the toilet system, since the presence of liquid in the feces container considerably impedes the handling of the filled container while at the same time it increases the leakage risks. The feces receptacle encloses, or more often is formed by, a plastic bag intended to be closed and carried away from the toilet whereas urine could be collected in a separate liquid container or be evacuated straight into the ground.

The main purpose of the invention is to suggest a device wherein the above outlined drawbacks are eliminated.

This purpose is achieved in accordance with the invention in that the toilet seat is located inside a toilet space having sufficient headroom above and in front of said seat in order to allow the user to assume a comfortable sitting position above said opening, but at the same time having insufficient headroom for the purpose of preventing or making considerably difficult urination by said user in a standing position from in front of the seat opening.

Owing to this arrangement the user is forced to make use of the toilet while in a sitting position and the risks for incorrect usage of the toilet thus are efficiently eliminated.

Preferably, the ceiling height increases continuously from the area above the toilet seat to the area in front of said seat. The result is that the roof may be given a very simple configuration well fitting the normally forwardly-inclined sitting posture of persons using the toilet. Owing to this arrangement the headroom may be kept very low, with the result that the intended effect of the toilet in this respect is applicable also in case of comparatively short individuals.

Preferably, the toilet space is formed by a mobile container having a roof portion which is movable between a raised position of use in which the above ceiling height or headroom space conditions exist, and a lowered position of transport in which the height of the container is reduced. This toilet design makes the toilet very suitable for field usages since the toilet, when not in use, may be collapsed to a very low height, i.e. a height not greatly exceeding the height of the toilet seat itself. Thus, the toilet could be easily handled by the persons carrying the toilet without the risk of the latter tipping over.

Furthermore, also transport by means of vehicles could be carried out without any tipping-over risks. In addition, it may be transported in vehicles with low headroom space, for instance in trucks of pick-up type having canvas type of covers or low height stationary superstructures.

Preferably, the container is formed by an upwardly open lower section including a bottom and side walls, one of said side walls having a preferably closeable entrance opening, and by a top section including side walls projecting downwards from the roof portion and bridging the vertical space between the lower section side walls and the roof in said raised position. This design provides a toilet space that is well enclosed and shut off from view from outside while at the same time it is easily accessible for use.

In addition, the roof portion preferably is pivotable about a hinge positioned above the area of the rear part of the toilet seat.

Thus, the advantageous inclination of the ceiling is automatically obtained when the roof portion is lifted.

Furthermore, the sides of the top section define an opening which extends in alignment with the entrance opening in the lower section and which also forms an entrance opening into the toilet space, said opening preferably also serving to admit light into the toilet space and providing the user with an outlook possibility. Also, this arrangement increases the accessability to the toilet space while at the same time contributing to reducing the closed-infeeling.

Preferably, this side walls of the lower section are essentially vertical and two of the downwardly projecting side walls of the top section extend in parallel and in separate planes from the corresponding side walls of the lower section in such a manner that said side walls on respectively the top and the lower sections are displaceable alongside one another.

Owing to this arrangement a comparatively high sealing efficiency is obtained with respect to the environments, both in the collapsed condition of the device and in its position of use. Consequently, unpleasant smells to the environment are sealed off as are also the effects from outdoor weather and climatic conditions, offering the user a comparatively comfortable and possibly also heated space.

Preferably the upper section is spring biased in the direction towards the raised position, i.e. the position of use. In this manner the risks that the upper section will unintentionally close down on the user is eliminated, which otherwise could have been hazardous.

One embodiment of the invention will be described in the following with reference to the accompanying drawings, wherein.

Figure 1:
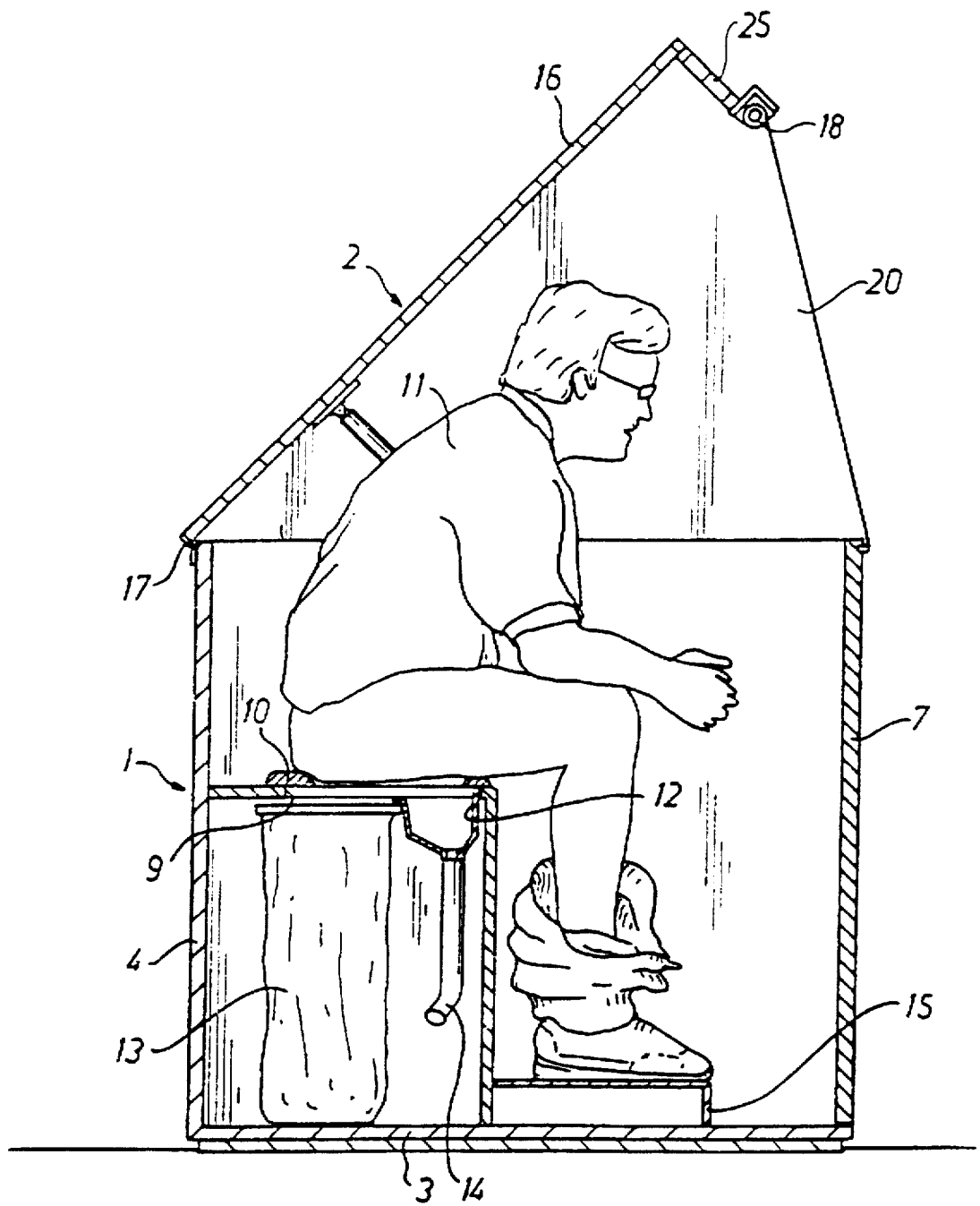
FIG. 1 is a vertical sectional view through a toilet arrangement in accordance with the invention, showing a person in a sitting position in a lateral view.

The device in accordance with the embodiment illustrated in the drawings consists of a toilet space formed by an essentially box-like lower section, generally denoted by reference 1, and a top section, generally denoted by reference 2 and arranged to be raised and lowered with respect to the lower section. The lower section is formed by a bottom 3 and by side walls 4, 5 and 6 projecting vertically upright from the bottom and by a hinged door 7 forming the front of the device. In the lower section is placed a separation-type of toilet 8 which comprises an annular seat 10 positioned above the seat opening 9. Underneath the seat opening and in the front part thereof as seen in the direction which the user 11 assumes when in a sitting position, an upwardly open urine receptacle 12 is positioned and at the rear, a collection receptacle 13 intended for feces. Also the feces receptacle 13 is open upwards. It is possible to equip the feces receptacle 13 with a supporting container, not illustrated in the drawings, to reduce the risk of the feces receptacle bursting.

Figure 3:
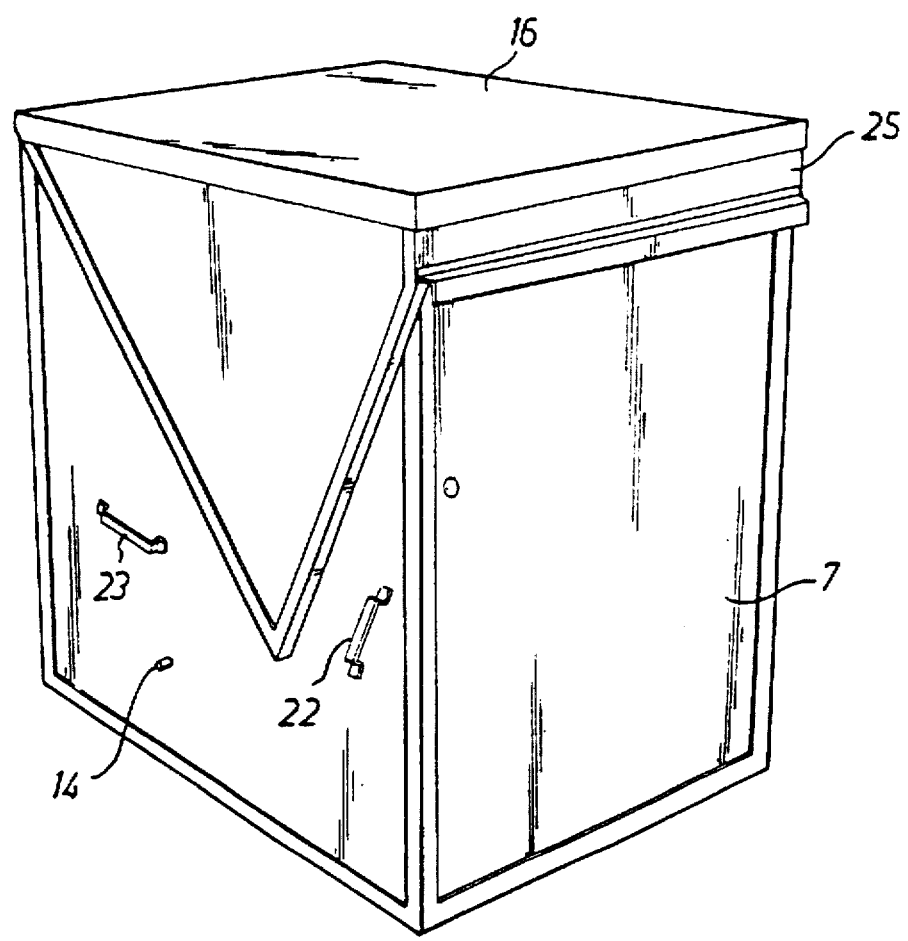
FIG. 3 is a perspective view of the device in its collapsed condition.

From the bottom of the urine receptacle 12 extends an outlet hose 14 which, as is most clearly apparent from FIG. 3, preferably is prolonged so as to extend through one of the side walls of the lower section. The outlet hose 14 could penetrate into the ground but it is likewise possible to place a urine collection tank inside the lower section or externally thereof for storage and transportation of urine. The toilet 8 may be of standard type and be freely positioned inside the lower section 1 or secured thereto, if desired with the aid of lateral gauge blocks for adaption to the internal width of the lower section.

Obviously there is nothing to prevent the toilet from being formed integrally with the lower section. Numeral reference 15 designates a foot rest which preferably extends all the way out to the side walls of the lower section.

The top section 2 consists of a roof portion 16 which by means of a hinge 17 is interconnected with the rear wall 4 of the lower section. At the front, the roof portion 16 is formed with a slightly angled front portion 25 in which is housed a roller mechanism 18 for reception of a curtain that may be pulled down so as to cover the front opening 19 of the top section. On opposite sides slab-like wall portions 20 project downwards from the roof portion 16, said wall sections 20 being illustrated in FIGS. 1 and 2 in their raised position wherein they extend to a level somewhat below the upper edge of the lower section side walls 5, 6. Numeral reference 21 designates a preferably gas-attenuated compression spring the spring action of which tends to maintain the upper section in the raised position illustrated in FIGS. 1 and 2. Preferably, one compression spring 21 is arranged on each side for the purpose of distributing the compression force and to prevent skewing. In accordance with the embodiment illustrated the toilet space is formed by a mobile container. In order to facilitate loading and unloading operations and terrain transportation of the toilet its lower section is provided on its external feces with a number of carrier handles 22, 23, at least on the two side walls 5 and 6.

Figure 2:
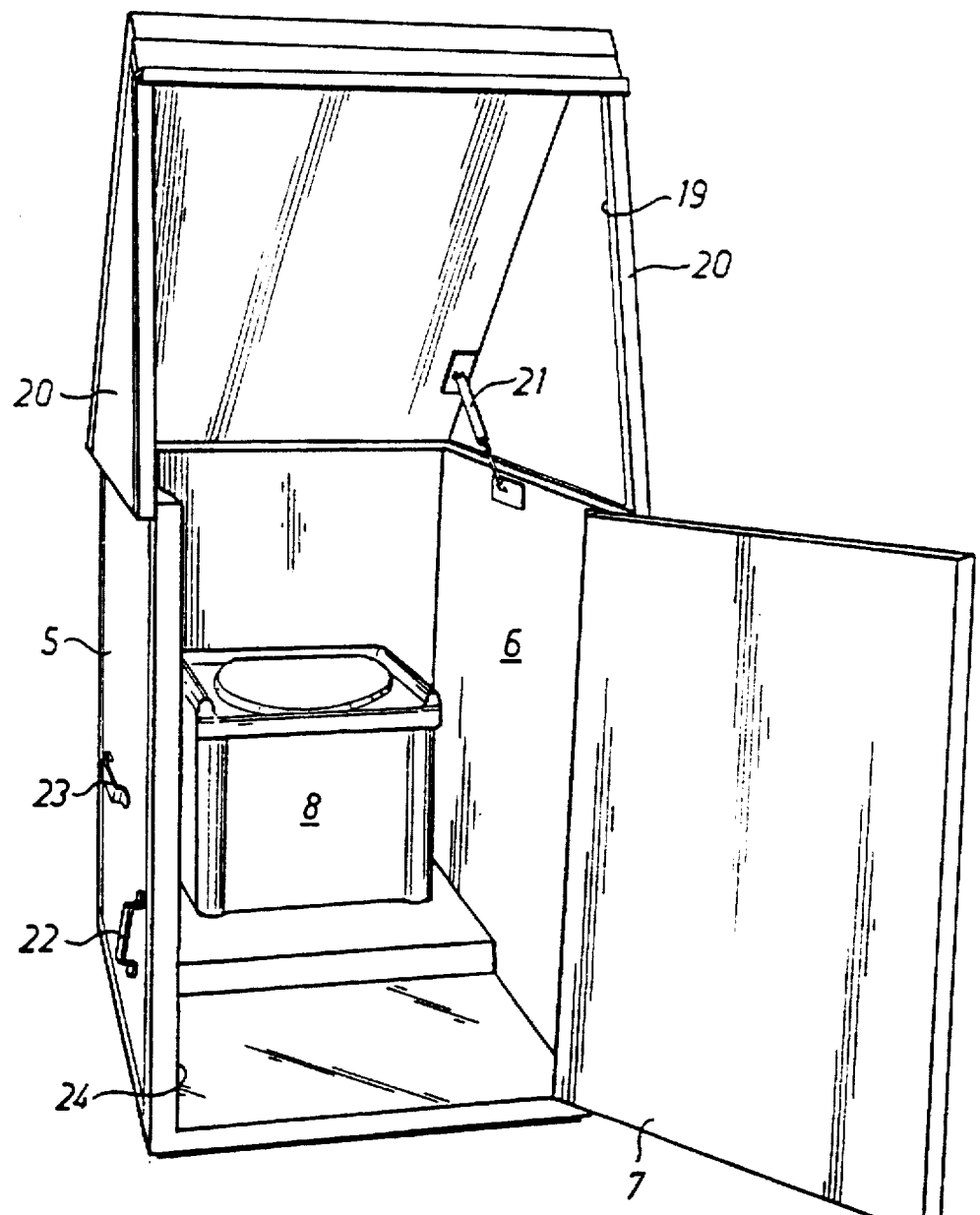
FIG. 2 is a perspective view as seen obliquely from the front of the device, the latter being in position of use with the front in open condition.

When the front door 7 is closed as illustrated in FIG. 1 the user 11 is offered good viewing possibilities through the front opening 19 in the upper section and consequently need not feel closed-in. If needed, the blind 18 could be pulled down across the front opening, shielding the user from view. The curtain 18 could be entirely transparent or tinted or made from a completely non-transparent material. If desired, several types of curtains may be arranged to assume a pulled-down position, allowing the user to choose whether he likes to have a clear or impeeded view through the front opening. The height from the seat opening 9 to the roof 2 above the seat opening is sufficient to allow the user 11 to assume a comfortable sitting position on the toilet without inconvenienced by the roof. However, the size of the headroom in the area in front of the toilet seat is adapted to prevent the user from assuming a standing position, or only with great difficulty assuming such a position, in front of the seat and urinate in that position in front of the seat. Should this have been possible urine would have reached the feces receptacle 13, which is not desirable. If urine besides feces were to be collected in the feces receptacle 13 the latter would be prematurely filled. At the same time this would involve risks of leakage, should the feces bag be punctured. In addition, the difficulties of handling the feces receptacles 13 after removal thereof from the toilet would have been increased. The foot rest 15, owing to its height, increases the difficulty of using the toilet in a standing position. In accordance with the embodiment illustrated the top section consists of a straight roof section 16 which is attached to the lower section by way of the hinge 17 and which is flanked laterally by two rigid triangular side walls 20 but obviously it is within the scope of the invention to give the top section a different design. The top section 2 could be configured differently without its ability to be raised in position of use and lowered from that position to a transport position being lost. For instance, the upper section could be telescopically displaceable relatively to the lower section, in which case the hinge 17 is not needed. The rigid side walls 20 could for instance be replaced by a flexible cloth, instead of the straight configuration of the roof, most clearly apparent from FIG. 1, which from the area above the toilet opening 9 increases in height continuously in a direction forwards, i.e. to the right as seen in FIG. 1, the roof could be formed with a step-like increasing or otherwise variably increasing height. If the demands on minimum measurements for storing and transportation purposes are not important the upper and lower sections of the toilet space could be rigidly interconnected, i.e. without possibility of lowering the top section. Provided the headroom conditions are as indicated, an incorrect use of the toilet could nonetheless be avoided. In accordance with the embodiment illustrated the side walls 5, 6 of the lower section as well as the side walls 20 of the top section are vertical and parallel to one another but positioned in separate planes to allow the walls to be displaceable along one another. Preferably, the walls are however, located sufficiently closely together to form efficient sealing means in themselves, or possibly with the aid of draft seal, sealing the toilet space against cold, wind and other unpleasant weather conditions. Also the curtain 18 could be used for such protection purposes. In order to allow the curtain to form an efficient seal alongside the edges 19 the curtain preferably is arranged to move inside guide rails extending along the sides of the opening 19. Possibly, the interior of the toilet space could be equipped with various desired commodity items, such as heating arrangements, wash basins, towel hangers, water tanks and the like. Alternatively, such items could also be positioned on the external fece of the device. Light-admittance openings could also be provided in the sides 20 of the top section. The entrance opening formed by the opening 19 in the upper section and the opening 24 of the lower section could be arranged in any one of the side walls 5 or 6 and extend up to the corresponding side of the upper section. In this case the door 7 in the front side is replaced by a stationary wall.

The invention is not limited to the embodiment described above but could be varied as to its details in many ways within the scope of the appended claims without departing from the fundamental idea of the invention.

We claim:

1. A device in connection with a separation toilet system, comprising:

a container, the container including a headroom space;

a reception means for collecting feces and urine, the reception means disposed within the container and including a urine receptacle and a feces receptacle, the reception means including an opening therein;

a toilet seat including an opening, the seat disposed on top of the reception means such that the toilet seat opening and the reception means opening are coextensive, the toilet seat opening including a front part and a rear part, and the urine and feces receptacles are disposed under the toilet seat opening such that the urine receptacle debouches into the front part of the toilet seat opening and the feces receptacle debouches into the rear part of the toilet seat opening;

wherein the container is adapted to allow a user having the size of an average sized adult to assume a sitting position on top of the toilet seat with headroom between the user and the container, while denying the user a standing position within the container when the user is positioned adjacent said reception means and in a position to use said reception means.

2. A device as claimed in claim 1, wherein the container is formed by a top section and an upwardly open lower section the lower section including a bottom wall (3) a rear wall and side walls, one (7) of said side walls having a closeable entrance opening (24), the top section (2) including a roof and side walls (20) projecting downwards from the roof portion (16) the roof is disposed at an angle with respect to the bottom wall, and the top and bottom sections delimit the headroom space of the container.

3. A device as claimed in claim 2, wherein the sides of the top section define a front opening (19) which extends in alignment with the entrance opening (24) formed in the lower section and which also formes an entrance opening into the headroom space when the top section is in a raised position, said front opening (19) also serving to admit light into the container and to provide the user with a view therefrom.

4. A device as claimed in claim 3, wherein the top section is spring biased in the direction towards the raised position.

5. A device as claimed in claim 2, wherein the lower sections side walls are essentially vertical and two of the downwardly projecting side walls (20) of the upper section (2) extend parallel to, but in separate planes from the corresponding associated side walls (5, 6) of the lower section in such a manner that said side walls of the top and the lower sections are displaceable alongside one another.

6. A device as claimed in claim 2, wherein the top section is spring biased in a direction towards a raised position while in use.

7. A device as claimed in claim 2, wherein a vertical distance between the roof and the bottom wall of the container define a ceiling height, the ceiling height decreases continuously from the entrance opening of the container, to the rear wall of the container.

8. A device as claimed in claim 7, wherein the container is transportable and includes a roof portion which delimits the headroom space and is movable between a raised position in use, and a lowered position for transport, wherein the headroom of the container is reduced when the roof portion is lowered for transport.

9. A device as claimed in claim 7, wherein the roof portion is pivotably hinged to the rear wall of the container at an area above the rear part of the toilet seat.

10. A device as claimed in claim 7, wherein the top section is spring biased in a direction towards a raised position while in use.

11. A device as claimed in claim 1, wherein the container is transportable and includes a roof portion (2) which delimits the headroom space and is movable between a raised position in use, and a lowered position for transport, wherein the headroom of the container is reduced when the roof portion is lowered.

12. A device as claimed in claim 11, wherein the roof portion (16) is pivotably hinged (17) to the container at an area above the rear part of the toilet seat opening (9, 10).

13. A device as claimed in claim 12, wherein the lower sections side walls are essentially vertical and two of the downwardly projecting side walls of the upper section extend parallel to, but in separate planes from the corresponding associated side walls of the lower section in such a manner that said side walls of the top and the lower sections are displaceable alongside one another.

14. A device as claimed in claim 12, wherein the roof portion is spring biased in the direction towards the raised position.

15. A device as claimed in claim 11, wherein the roof portion is spring biased in a direction towards the raised position.

16. The device as claimed in claim wherein the headroom of the container is insufficient to allow the user to stand in the container while using the reception means.

* * * * *